United States Patent [19]

Anthes et al.

[11] Patent Number: 5,015,361
[45] Date of Patent: May 14, 1991

[54] CATALYTIC DEWAXING PROCESS EMPLOYING SURFACE ACIDITY DEACTIVATED ZEOLITE CATALYSTS

[75] Inventors: Robert J. Anthes, Hamilton Square; Ross A. Kremer, Ringoes, both of N.J.

[73] Assignee: Mobil Oil Corp., Fairfax, Va.

[21] Appl. No.: 299,905

[22] Filed: Jan. 23, 1989

[51] Int. Cl.$^5$ .............................................. C10G 47/16
[52] U.S. Cl. ..................................... 208/111; 502/64; 502/77
[58] Field of Search ................ 208/111; 585/734, 733, 585/739; 502/641

[56] References Cited

U.S. PATENT DOCUMENTS

| | | |
|---|---|---|
| Re. 28,398 | 4/1975 | Chen et al. . |
| 3,668,113 | 6/1972 | Burbidge et al. . |
| 3,755,138 | 8/1973 | Chen et al. . |
| 3,894,938 | 7/1975 | Gorring et al. . |
| 3,956,102 | 5/1976 | Chen et al. . |
| 4,002,697 | 1/1977 | Chen . |
| 4,053,532 | 10/1977 | Ireland et al. . |
| 4,100,215 | 7/1978 | Chen . |
| 4,101,595 | 7/1978 | Chen et al. . |
| 4,176,050 | 11/1979 | Chen et al. . |
| 4,181,598 | 1/1980 | Gillespie et al. . |
| 4,222,855 | 9/1980 | Pelrine et al. . |
| 4,229,282 | 10/1980 | Peters et al. . |
| 4,247,388 | 1/1981 | Banta et al. . |
| 4,358,362 | 11/1982 | Smith et al. . |
| 4,372,839 | 2/1983 | Oleck et al. . |
| 4,390,414 | 6/1983 | Cody ..................... 208/111 |
| 4,419,220 | 12/1983 | LaPierre et al. . |
| 4,501,926 | 2/1985 | LaPierre et al. . |
| 4,518,485 | 5/1985 | LaPierre et al. . |
| 4,520,221 | 5/1985 | Hsia Chen ........................ 585/533 |
| 4,541,919 | 9/1985 | LaPierre et al. . |
| 4,554,065 | 11/1985 | Albinson et al. ...................... 208/59 |
| 4,568,786 | 2/1986 | Hsia Chen et al. . |
| 4,601,993 | 7/1986 | Chu et al. ........................... 208/111 |
| 4,612,108 | 9/1986 | Angevine et al. . |
| 4,797,266 | 1/1989 | Evans ............................... 423/328 |
| 4,836,910 | 6/1989 | Van de Grieno .................. 288/111 |
| 4,868,146 | 9/1989 | Chu et al. ........................... 502/64 |

Primary Examiner—Anthony McFarlane

[57] ABSTRACT

Catalytic dewaxing of a waxy component-containing hydrocarbon feed is accomplished with improved selectivity employing, as catalyst, a zeolite the surface acid catalytic activity of which has been at least partially reduced by chemisorption of a surface-deactivating agent such as a bulky amine thereon. The invention is especially useful for the hydrodewaxing of a waxy lube range product to provide a high viscosity index, low pour point, low cloud point lubricating oil product.

26 Claims, No Drawings

CATALYTIC DEWAXING PROCESS EMPLOYING SURFACE ACIDITY DEACTIVATED ZEOLITE CATALYSTS

CROSS REFERENCE TO RELATED APPLICATION

This application relates by subject matter to commonly assigned, concurrently filed U.S. Pat. application Ser. No. 07/299,856, filed 23 Jan. 1989, by Rober J. Anthes and Ross A. Kremer entitled "Catalytic Dewaxing of Lubricating Oil Stock Derived From Oligomerized Olefin".

BACKGROUND OF THE INVENTION

This invention relates to the catalytic dewaxing of waxy component-containing hydrocarbon oils. It is especially directed to the preparation of lubricating oils having a high viscosity index, a high 650° F.+ yield and reduced pour and cloud points.

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require a considerable resort to empiricism in practical refining. Underlying these quantitative uncertainties is the complexity of the molecular constitution of lubricating oils. Because lubricating oils for the most part are based on petroleum fractions boiling above about 450° F., the molecular weights of the hydrocarbon constituents are high and these constituents display almost all conceivable structure types. This complexity and its consequences are referred to in well-known treatises, such as, for example, "Petroleum Refinery Engineering" by W.L. Nelson, McGraw-Hill Book Company, Inc., New York, NY 1958 (4th Ed.).

In general, the basic premise in lubricant refining is that a suitable crude oil, as shown by experience or by assay, contains a quantity of lubricant stock having a predetermined set of properties, such as, for example, appropriate viscosity, oxidation stability and maintenance of fluidity at low temperatures. The process of refining to isolate that lubricant stock consists of a set of subtractive unit operations which removes the unwanted components. The most important of these unit operations includes distillation, solvent refining and dewaxing which are basically physical separation processes in the sense that if all of the separated fractions were to be recombined, the crude oil would be reconstituted.

A refined lubricant stock can be used by itself or it can be blended with another refined lubricant stock having different properties. The refined lubricant stock prior to use as a lubricant can also be compounded with one or more additives which function, for example, as antioxidants, extreme pressure additives, V.I. improves, and the like.

For the preparation of a high grade distillate lubricating oil stock, the current practice is to vacuum distill an atmospheric tower residuum from an appropriate crude oil as the first step. This step provides one or more raw stocks within the boiling range of from about 450° to about 1050° F. After preparation of a raw stock of suitable boiling range, it is extracted with a solvent, e.g., furfural, phenol, sulfolane or chlorex, which is selective for aromatic hydrocarbons and which removes undesirable components. The raffinate from solvent refining is then dewaxed, for example, by admixing with a solvent, e.g., a blend of methyl ethyl ketone and toluene. The mixture is chilled to induce crystallization of the parafin waxes which are then separated from the raffinate. Sufficient quantities of wax are removed to provide the desired pour point for the raffinate.

Other known and conventional processes such as hydrofinishing or clay percolation can be used if needed to reduce the nitrogen and sulfur content or improve the color of the lubricating oil stock.

Viscosity index (V.I.) is a quality parameter of considerable importance for distillate lubricating oils to be used in automotive engines and aircraft engines subject to wide variations in temperature. This index indicates the degree of change of viscosity with temperature. A high V.I., e.g., one of at least about 85, indicates an oil which resists the tendency to become excessively viscous at low temperature or excessively thin at high temperatures. Measurement of the Saybolt Universal Viscosity of an oil at 100° and 210° F. and referral to correlations provides a measure of the V.I. of an oil. For purposes of the present invention, whenever V.I. is referred to, the V.I. as noted in the Viscosity Index tabulations of ASTM D567 published by ASTM, or equivalent, is intended.

The dewaxing mechanism of catalytic hydrodewaxing is different from that of solvent dewaxing resulting in some differences in chemical composition. Catalytically dewaxed products produce a haze on standing at 10° F. above specification pour point for more than twelve hours—known as Overnight Cloud (ONC) formation. The extent of this ONC formation is less severe with solvent dewaxed oils. Although such an ONC formation does not affect the product quality of catalytically dewaxed oils, it is beneficial to reduce the Overnight Cloud (ONC) formation since in some areas of the marketplace any increase is considered undesirable.

In recent years, catalytic techniques have become available for the dewaxing of petroleum stocks. A process of that nature developed by British Petroleum is described in *The Oil and Gas Journal*, dated Jan. 6, 1975, at pages 69–73. See also U.S. Pat. No. 3,668,113.

U.S. Pat. Reissue No. 29, 398 (of original U.S. Pat. No. 3,700,585) describes a process for catalytic dewaxing with a catalyst comprising zeolite ZSM-5. Such a process combined with catalytic hydrofinishing is described in U.S. Pat. No. 3,894,938.

U.S. Pat. No. 3,755,138 describes a process for mild solvent dewaxing to remove high quality wax from a lube stock which is then catalytically dewaxed to specification pour point.

U.S. Pat. No. 3,956,102 is directed to a process for the hydroewaxing of petroleum distillates utilizing a ZSM-5 type zeolite catalyst.

U.S. Pat. No. 4,053,532 is directed to a hydrodewaxing operation involving a Fischer-Tropsch synthesis procut utilizing ZSM-5 zeolite.

U.S. Pat. No. 4,247,388 describes dewaxing operations utilizing ZSM-5 type zeolites of specific activity.

U.S. Pat. No. 4,222,855 describes dewaxing operations to produce lubricating oils of low pour point and high V.I. utilizing zeolites including ZSM-23 and ZSM-35. U.S. Pat. No. 4,372,839 describes a method for dewaxing crude oils of high wax content by contacting the oils with two different zeolites, e.g., ZSM-5 and ZSM-35.

U.S. Pat. Nos. 4,419,220, 4,501,926 and 4,554,065 each describes a dewaxing process utilizing a zeolite Beta catalyst.

U.S. Pat. No. 4,541,919 describes a dewaxing process which utilizes a selectively coked large pore zeolite such as zeolite X, Y or Beta as catalyst.

The modification of zeolites by exchange and similar technology with large cations such as N+ and P+ and large branched compounds such as polyamines and the like is described in U.S. Pat. No. 4,101,595. Bulky phenolic and silicating zeolite surface-modifying agents are described in U.S. Pat. Nos. 4,100,215 and 4,002,697, respectively. As disclosed in U.S. Pat. Nos. 4,520221 and 4,568,786, zeolites which have been surface-deactivated by treatment with bulky dialkylamines are useful as catalysts for the oligomerization of lower olefins such as propylene to provide lubricating oil stocks.

As far as is known, surface-deactivated zeolites have heretofore not been known for use as hydrodewaxing catalysts.

SUMMARY OF THE INVENTION

It is an object of the present invention to provide an improved catalytic hydrodewaxing process for the selective dewaxing of a waxy component-containing hydrocarbon feed.

It is another object of the invention to provide a process for the catalytic hydrodewaxing of a waxy component-containing lubricating oil stock, and in particular, one which is based on oligomerized lower olefin, to provide a high viscosity, low pour point lubricating oil product.

It is a particular object of the invention to carry out the catalytic hydrodewaxing of a waxy component-containing hydrocarbon feed employing as catalyst, a surface-deactivated zeolite.

By way of satisfying these and other objects of the invention, in a process for dewaxing a waxy component-containing hydrocarbon feed in which the feed is contacted with a zeolite hydrodewaxing catalyst under hydrodewaxing conditions to provide a dewaxed product, an improvement is provided which comprises employing a zeolite hydrodewaxing catalyst the zeolite surface of which has been at least partially deactivated for acid catalyzed reactions by chemisorption of a surface-deactivating agent which possesses an average cross section diameter greater than that of the zeolite pores.

The use of a zeolite hydrodewaxing catalyst which has been at last partially surface-deactivated in accordance with the invention possesses a decided advantage over the same zeolites the acid sites of which remain substantially intact. In the case of the latter, the acid catalyst activity which is exhibited at the zeolite surface (which is all the greater as the average crystallite size of the zeolite is reduced) is responsible for an undesirable incidence of cracking which increases the amount of lower value products and decreases the amount of desired product resulting from the hydrodewaxing operation in which such zeolites are used. In contrast to such unmodified zeolites, the hydrodewaxing process herein employs a zeolite whose surface acid catalyst activity, and therefore cracking activity, has been significantly reduced by treatment with a surface-deactivating agent. The result, then, in the case of the hydrodewaxing process of the present invention is a higher yield of desired de waxed product and a reduced yield of undesired, low-value products.

DESCRIPTION OF THE PREFERRED EMBODIMENTS

The improved catalytic hydrodewaxing process herein can be used to dewax a variety of waxy component-containing hydrocarbon feedstocks ranging from relatively light distillate fractions up to high boiling stocks such as whole crude petroleum reduced crudes, vacuum tower residua, propane deasphalted residua, e.g., brightstock, cycle oils, FCC tower bottoms, gas oils, vacuum gas oils, deasphalted residua and other heavy oils. The feedstock will normally be a $C_{10}+$ feedstock since lighter oils will usually be free of significant quantities of waxy components. However, the process of this invention is also particularly useful with waxy distillate stocks such as gas oils, kerosenes, jet fuels, lubricating oil stocks, heating oils, hydrotreated oil stock, furfural-extracted lubricating oil stock and other distillate fractions whose pour point and viscosity need to be maintained within certain specification limits. Lubricating oils stocks, for example, will generally boil above about 450° F. (230° C.) and more easily above about 600° F. (315° C.). For purposes of this invention, lubricating oil, or lube oil, is that part of a hydrocarbon feedstock having a boiling point of 600° F. (315° C.) or higher, as determined by ASTM D-1160 test method.

Also regarded as lubricating oils which are suitable as feeds herein are the waxy component-containing lube range olefin oligomers disclosed in U.S. Pat. No. 4,568,786 and U.S. Pat. application Ser. No. 140,361, field Jan. 4, 1988, the contents of which are incorporated by reference herein. These materials are derived from the catalytic oligomerization of a lower olefin such as propylene in the presence of a surface-deactivated olefin oligomerization catalyst to provide an intermediate olefin oligomer product at least a fraction of which is further oligomerized employing any known or conventional acidic olefin oligomerization/isomerization catalyst to provide a waxy lube range product.

In general, hydrodewaxing conditions include a temperature between about 450° F. (230° C.) and about 750° F. (400° C.), a pressure between 0 and about 3000 psig and preferably between about 100 and about 1000 psig. The liquid hourly space velocity (LHSV), i.e., the volume of feedstock per volume of catalyst per hour, is generally between about 0.1 and about 10 and preferably between 0.2 and about 4 and the hydrogen to feed stock ratio is generally between about 500 and about 8000 and preferably between about 800 and 4000 standard cubic feed (SCF) of hydrogen per barrel.

A preliminary hydrotreating step to remove nitrogen and sulfur and to saturate aromatics to naphthenes without substantial boiling range conversion will usually improve catalyst performance and permit lower temperatures, higher space velocities, lower pressures or combinations of these conditions to be employed.

The catalytic dewaxing process of this invention is conducted by contacting the feed to be dewaxed with the defined crystalline silicate zeolite dewaxing catalyst, e.g., provided as a slurry bed or a transport bed. The dewaxing catalyst which is employed in the improved hydrodewaxing process of this invention can be selected from among any of the many zeolites which have heretofore been disclosed as useful for the catalysis of hydrodewaxing operations provided its surface acidity has been at least partially reduced by prior and/or in situ treatment with a surface-deactivating agent, e.g., as disclosed in U.S. Pat. Nos. 4,520,221 and 4,568,786, the contents of which are incorporated by reference herein. Thus, the useful zeolites include one or a combination of the following known zeolite hydrodewaxing catalysts: ZSM-5, ZSM-11, ZSM-12, ZSM-20, ZSM-23, ZSM-34, ZSM-35, ZSM-38, ZSM-48, ZSM-50 and zeolite Beta to name a few.

Zeolite ZSM-5 is described in U.S. Pat. Nos. 3,702,886 and Re. 29,949, the disclosure of which is incorporated by reference herein.

Zeolite ZEM-11 is described in U.S. Pat. No. 3,709,979, the disclosure of which is incorporated by reference herein.

Zeolite ZSM-12 is described in U.S. Pat. No. 3,832,449, the disclosure of which is incorporated by reference herein.

Zeolite ZSM-20 is described in U.S. Pat. No. 3,972,983, the disclosure of which is incorporated by reference herein.

Zeolite ZSM-23 is described in U.S. Pat. No. 4,076,342, the disclosure of which is incorporated by reference herein.

Zeolite ZSM-34 is described in U.S. Pat. No. 4,086,186, the disclosure of which is incorporated by reference herein.

Zeolite ZSM-35 is described in U.S. Pat. No. 4,016,245the disclosure of which is incorporated by reference herein.

Zeolite ZSM-38 is described in U.S. Pat. No. 4,046,859, the disclosure of which is incorporated by reference herein.

Zeolite ZSM-48 is described in U.S. Pat. No. 4,397,827, the disclosure of which is incorporated by reference herein.

Zeolite ZSM-38 is described in U.S. Pat. No. 4,046,859, the disclosure of which is incorporated by reference herein.

Zeolite ZSM-50 is described in U.S. Pat. No. 4,640,829, the disclosure of which is incorporated by reference herein.

Zeolite Beta is described in U.S. Pat. Nos. 3,308,069 and Re. 28,341, the entire contents of which are incorporated by reference herein.

The extent to which the zeolite can be surface-deactivated can vary over considerable limits, depending on the conditions of the deactivation procedure, and still provide significant improvement over the same zeolite which has not been surface-deactivated. In general, a reduction in surface acid sites on the order of at least about 10%, and preferably at least about 20%, can be readily achieved employing the methods described below.

Deactivation of the surface acid catalytic activity of the selected zeolite can be accomplished in accordance with known and conventional methods. Thus, treatment of the zeolite surface with basic compounds such as amines, phosphines, phenols, polynuclear hydrocarbons, cationic dyes, and the like, will provide the requisite reduction in surface acid catalytic activity.

These surface deactivating agents should have an average cross section diameter of about 5 Angstroms or greater in order to prevent their being sorbed within the zeolite. Examples of suitable amines include monoamines, diamines, triamines, aliphatic and aromatic cyclic amines and heterocyclic amines, porphines, phthalocyanines, 1,10-phenanthroline, 4,7-diphenyl-1,10-phenanthroline, 3,4,7,8-tetramethyl-1,10-phenanthroline, 5,6-benzoquinoline, 2,2':6',2''-terpyridine, 2,4,6-tris(2-pyridyl)-S-triazine and 2,3-cyclododecenopyridine. Examples of phosphines include triphenylphospine and 1,2-bis(diphenylphosphine)ethane. Suitable phenols are, for example, di-t-butylphenol, alkylated naphthol and 2,4,6-trimethylphenol. Polynuclear hydrocarbons include substances such as pyrene and phenanthrene. Cationic dyes include thionine, methylene blue and triphenylmethane dyes, such as malachite green and crystal violet. Another surface modification technique is deactivation by treating with metal compounds. Suitable metal compounds are magnesium acetate, metal-porphines such as hemin or iron (III) porphine chloride, cobalticinium chloride $(C_5H_5)_2CoCl$ and titanocene dichloride (biscyclopentadienyl titanium dichloride) and large complex cations such as $[Co(NH_2R)_6]^{2+}$ where R is H or alkyl, $[Pt(NH_2R)_4]^{2+}$ where R is alkyl, $]Co(en)_3]^{3+}$ where en is ethylenediamine and manganese (III) meso-tetraphenylporphine.

The zeolites can also be treated with organic silicon compounds as described in U.S. Pat. Nos. 4,100,215 and 4,002,697, the contents of which are incorporated by reference herein, to impart the desired degree of surface deactivation while being essentially free of carbonaceous deposits. Such treatment involves contacting the catalyst with a silane surface-modifying agent capable of deactivating catalytic (acidic) sites located on the external surface of the zeolite by chemisorption.

Amines having an average cross section diameter larger than about 5 Angstroms are especially suitable for reducing zeolite surface acid catalysis activity. Examples of such amines include substituted quinolines, heterocyclic amines and alkyl-substituted pyridines such as 2,4 or 1,6-dialkyl pyridines and 2,4,6-trialkyl pyridines. Preferred are bulky, sterically-hindered di-ortho-alkyl pyridines such as 2,6-di-tert-butylpyridine as described in U.S. Pat. Nos. 4,520,221 and 4,568,786 referred to above, and 2,4,6-collidine (2,4,6-trimethyl pyridine) as disclosed in U.S. Pat. application Ser. No. 140,361 referred to above.

The zeolite is preferably associated with a hydrogenation-dehydrogenation component regardless of whether hydrogen is added during the isomerication process since the isomerization is believed to proceeds by dehydrogenation through an olefinic intermediate which is then dehydrogenated to the isomerized product, both these steps being catalyzed by the hydrogenation/dehydrogenation component. The hydrogenation/dehydrogenation component is preferably a noble metal such as platinum, palladium or other member of the platinum group such as rhodium. Combinations of noble metals such as platinum-rhenium, platinum-palladium, platinum-iridium or platinum-iridium-rhenium together with combinations with non-noble metals, particularly of Groups VIA and/or VIIA, are of interest, particularly with metals such as cobalt, nickel, vanadium, tungsten titanium and molybdenum, for example, platinum-tungsten, platinum-nickel or platinum-nickel-tungsten.

The metal may be incorporated into the catalyst by any suitable method such as impregnation or exchange onto the zeolite. The metal may be incorporated in the form of a cationic, anionic or neutral complex such as $Pt(NH_3)_4{}^{2+}$ and cationic complexes of this type will be found convenient for exchanging metals onto the zeolite. Anionic complexes such as the vanadate or metatungstate ions are useful for impregnating these metals into the zeolites.

The amount of the hydrogenation-dehydrogenation component is suitable from 0.01 to 10 percent by weight, normally 0.1 to 5 percent by weight, although this will, of course, vary with the nature of the component, less of the highly active noble metals, particularly platinum, being required than of the less active base metals.

Base metal hydrogenation/dehydrogenation components such as cobalt, nickel, molybdenum and tungsten may be subjected to a pre-sulfiding treatment with a sulfur-containing gas such as hydrogen sulfide in order to convert the oxide forms of the metal to the corresponding sulfides.

It may be desirable to incorporate the catalyst in another material which is resistant to the temperature and other conditions employed in the process. Such matrix materials include synthetic or natural substances as well as inorganic materials such as clay, silica and/or metal oxides. The latter may be either naturally occurring or in the form of gelatinous precipitates or gels. Clays which can be composited with the catalyst include those of the montmorillonite and kaoline families. These clays can be sued in the raw state as originally mined or initially subjected to calcination, acid treatment or chemical modification.

In addition to the foregoing materials, the zeolites can be composited with a metal oxide binder material such as alumina, silica-alumina, silica-magnesia, silica-zironcia, silica-thoria, silica-berylia, silica-titania as well as ternary compositions such as silica-alumina-thoria, silica-alumina-zirconia, silica-alumina-magnesia, and silica-magnesia-zirconia. The matrix can be in the form of cogel. It may also be advantageous to provide at least part of the metal oxide binder, e.g., an amount representing from about 1 to about 100 weight percent and preferably from about 2 to about 60 weight percent of total binder, in colloidal form so as to facilitate the extrusion of the bound zeolite.

The relative proporations of zeolite component and binder material, on an anhydrous basis, can vary widely with the zeolite content ranging from about 1 to about 99 wt. %, and more usually from about 5 to about 90 wt. % of the dry composite.

In the examples which follow, Example 1 is illustrative of the preparation of a propylene oligomer-based waxy lubricating oil stock, Examples 2 and 3 illustrate the catalytic hydrodewaxing of said lubricating oil stock employing an unmodified zeolite, i.e., one retaining substantially its full original surface acid catalytic activity, and Example 4 is illustrative of the improved catalytic hydrodewaxing process of this invention, i.e., utilizing a surface-deactivated zeolite hydrodewaxing catalyst.

EXAMPLE 1

This example illustrates the preparation of a propylene oligomer-based waxy lubricating oil stock for use as feed in the catalytic hydrodewaxing operation illustrated in Examples 2 to 4.

Propylene was oligomerized over 2,4,6-collidine-modified H-ZSM-23 at 200° C., 800 psig and a WHSV of 0.25 hr$^{-1}$. The product, consisting of $C_6$–$C_{30}$ olefins, was distilled and the $\geq C_{12}$ fraction was oligomerized over H-ZSM-5 at 175° C. and 0.1 hr$^{-1}$ WHSV. This product was distilled, the 700° F.+ fraction having the following properties:

| | |
|---|---|
| Kinematic viscosity @ 100° C. (cSt) | 4.47 |
| Viscosity Index | 137 |
| Pour Point (°C.) | −20 |
| Cloud Point (°C.) | +30 |

EXAMPLE 2

A platinum-containing ZSM-23 hydrodewaxing catalyst was activated as follows: Pt/ZSM-23 containing 0.22 wt. % Pt was dried over nitrogen for 1 hour at 700° F. and then reduced over hydrogen at 700° F. for six hours.

60 gm of the lube feedstock of Example 1 and 8 gm of the activated Pt/H-ZSM-23 catalyst were charged to a 450 cc autoclave reactor. Agitation was started and hydrogen was added to bring the system pressure to 400 psig. The system was heated to 260–290° C. (500–550° F.) and opened to a hydrogen cylinder to maintain pressure at 400 psig. The reaction was carried out for 48 hours after which the system was cooled and vented. The liquid product was decanted/filtered away from the catalyst and distilled, the 700° F.+ product having the following properties:

| | |
|---|---|
| Kinematic viscosity @ 100° C. (cSt) | 4.69 |
| Viscosity Index | 123 |
| Pour Point (°C.) | −50 |
| Cloud Point (°C.) | <−50 |

Gas chromatographic analysis of the dewaxed lubricating oil product (prior to distillation to give the 700° F.+ lube product gave the following results:

| | 650° F.+ | 700° F.+ | 750° F.+ |
|---|---|---|---|
| Yield of Lube, Wt. % | 74 | 65 | 40 |

EXAMPLE 3

61 gm of the lube feedstock of Examples 1 and 7.9 gm of the activated Pt/H-ZSM-23 catalyst of Example 2 were charged to a 450 cc autoclave reactor. Agitation was started and hydrogen was added to bring the system pressure to 200 psig. The system was heated to 275° C. (525° F.) and opened to a hydrogen cylinder to maintain pressure at 420 psig. The reaction was carried out for 12 hours after which the system was cooled and vented. The liquid product was decanted/filtered away from the catalyst and distilled, the 700° F.+ product having the following properties:

| | |
|---|---|
| Kinematic viscosity @ 100° C. (cSt) | 4.60 |
| Viscosity Index | 133 |
| Pour Point (°C.) | −50 |
| Cloud Point (°C.) | −30 |

Gas chromatographic analysis of the dewaxed lubricating oil product (prior to distillation to give the 700° F.+ lube product) gave the following results:

| | 650° F.+ | 700° F.+ | 750° F.+ |
|---|---|---|---|
| Yield of Lube, Wt. % | 78 | 73 | 55 |

EXAMPLE 4

The hydrodewaxing catalyst of Examples 2 and 3 was surface-deactivated and employed in the dewaxing of the waxy lubricating oil of Example 1 under essentially the same conditions as in Examples 2 and 3.

The catalyst was modified as follows: 8.5 gm of the catalyst was contacted with a solution containing 0.0517 gm of 2,4,6-collidine and 75 ml pentane followed by evaporation of the pentane to provide the surface acid catalytic activity-deactivated zeolite.

61 gm of the waxy component-containing feedstock from Example 1 and 8.5 gm of surface acid catalytic activity-deactivated Pt/ZSM-23 were charged to a 450 cc autoclave reactor. Agitation was started and hydrogen was added to bring the system pressure to 200 psig. The system was heated to 290–310° C. (550–590° F.) and opened to a hydrogen cylinder to maintain pressure at 420 psig. The reaction was carried out for 21 hours after which the system was cooled and vented. The liquid product was decanted/filtered away from the catalyst and distilled, the 700° F.+ product having the following properties:

| | |
|---|---|
| Kinematic viscosity @ 100° C. (cSt) | 4.76 |
| Viscosity Index | 130 |
| Pour Point (°C.) | −52 |
| Cloud Point (°C.) | −35 |

Gas chromatographic analysis of the dewaxed lubricating oil product (prior to distillation to give the 700° F.+ lube product) gave the following results:

| | 650° F.+ | 700° F.+ | 750° F.+ |
|---|---|---|---|
| Yield of Lube, Wt. % | 84 | 80 | 61 |

Thus, with the same or better product properties compared to Examples 2 and 3 (i.e., higher V.I., lower pour point and lower cloud point), the 700° F.+ lube yield of this example was 7–15% higher.

WHAT IS CLAIMED IS:

1. In a process for dewaxing a waxy component-containing hydrocarbon feedstock in which the feed is contacted with a zeolite hydrodewaxing catalyst under hydrodewaxing conditions to provide a dewaxed product, the improvement which comprises employing a zeolite hydrodewaxing catalyst, the zeolite surface of which has been at least partially deactivated for acid catalyzed reactions by chemisorption of a sterically-hindered amine surface-deactivating agent which possesses an average cross section diameter greater than that of the zeolite pores.

2. The process of claim 1 wherein the feedstock is a waxy component-containing lube range material.

3. The process of claim 1 wherein the feedstock is a waxy component-containing lube range material based on an olefin oligomer.

4. The process of claim 1 wherein the feedstock is a waxy component-containing lube range material based on a propylene oligomer.

5. The process of claim 1 wherein the feedstock is a waxy component-containing hydrocarbon oil boiling above about 350° F.

6. The process of claim 5 wherein the feedstock is a waxy component-containing solvent-refined hydrocarbon oil.

7. The process of claim 1 wherein the hydrodewaxing conditions comprise a temperature of from about 450° F. to about 750° F., a pressure of from about atmospheric pressure to about 3000 psig, a liquid hourly space velocity of from about 0.1 to about 10 and a hydrogen to feedstock ratio of from about 500 to about 8000 standard cubic feet per barrel.

8. The process of claim 1 wherein the zeolite is selected from the group consisting of ZSM-5, ZSM-11, ZSM-12, ZSM-20, ZSM-23, ZSM-34, ZSM-35, ZSM-38, ZSM-48, ZSM-50 and zeolite Beta.

9. The process of claim 1 wherein the surface-deactivating agent is selected is selected from the group consisting of dialkyl amine and trialkyl amine.

10. The process of claim 1 wherein the surface-deactivating agent is selected from the group consisting of 2,6-di-tert-butyl pyridine and 2,4,6-collidine.

11. The process of claim 1 wherein at least about 10 percent of the total number of the zeolite surface acid sites have been deactivated.

12. The process of claim 1 wherein at least about 20 percent of the total number of the zeolite surface acid sites have been deactivated.

13. The process of claim 1 wherein the zeolite is associated with at least one hydrogenation component.

14. The process of claim 1 wherein the zeolite is associated with at least one hydrogenation component selected from the group consisting of platinum, palladium and zinc.

15. The process of claim 1 wherein the zeolite is bound with a substantially catalytically inactive inorganic matrix material.

16. The process of claim 1 wherein the zeolite is bound with silica.

17. A process for catalytically hydrodewaxing a waxy component-containing lubricating oil derived from the oligomerization of a lower olefin which comprises contacting said oil with a zeolite hydrodewaxing catalyst under hydrodewaxing conditions to provide a dewaxed lubricating oil of high viscosity index, low pour point and low cloud point, the surface of the zeolite being at least partially deactivated for acid catalyzed reactions by chemisorption of a sterically-hindered amine surface-deactivating agent which possessed an average cross section diameter greater than that of the zeolite pores.

18. The process of claim 17 wherein the waxy component-containing lubricating oil is at least a C10+ fraction of a propylene oligomer obtained by the catalytic oligomerization of propylene in the presence of a surface-deactivated zeolite olefin oligomerization catalyst to provide an intermediate propylene oligomer product followed by the further acid catalytic oligomerization of at least a portion of the intermediate oligomer product to provide a lube range product which is then fractionated to provide said waxy component-containing lubricating oil fraction.

19. The process of claim 17 wherein the hydrodewaxing conditions comprise a temperature of from about 450° F. to about 750° F., a pressure of from about atmospheric pressure to about 3000 psig, a liquid hourly space velocity of from about 0.1 to about 10 and a hydrogen to feedstock ratio of from about 500 to about 800 standard cubic feet per barrel.

20. The process of claim 17 wherein the zeolite is selected from the group consisting of ZSM-5, ZSM-11, ZSM-12, ZSM-20, ZSM-23, ZSM-34, ZSM-35, ZSM-38, ZSM-48, ZSM-50 and zeolite Beta.

21. The process of claim 17 wherein the zeolite is associated with at least one hydrogenation component.

22. The process of claim 17 wherein the zeolite is associated with at least one hydrogenation component selected from the group consisting of platinum, palladium and zinc.

23. The process of claim 18 wherein the hydrodewaxing conditions comprise a temperature of from about 450° F. to about 750° F., a pressure of from about atmospheric pressure to about 3000 psig, a liquid hourly space velocity of from about 0.1 to about 10, and a hydrogen to feedstock ratio of from about 500 to about 800 standard cubic feet per barrel.

24. The process of claim 18 wherein the zeolite is selected from the group consisting of ZSM-5, ZSM-11, ZSM-12, ZSM-20, ZSM-23, ZSM-34, ZSM-38, ZSM-48, ZSM-50 and zeolite Beta.

25. The process of claim 18 wherein the zeolite is associated with at least one hydrogenation component.

26. The process of claim 18 wherein the zeolite is associated with at least one hydrogenation component selected from the group consisting of platinum, palladium and zinc.

* * * * *

UNITED STATES PATENT AND TRADEMARK OFFICE
CERTIFICATE OF CORRECTION

PATENT NO. : 5,015,361

DATED : May 14, 1991

INVENTOR(S) : Robert J. Anthes et al.

It is certified that error appears in the above-identified patent and that said Letters Patent is hereby corrected as shown below:

column 10, line 13, patent reads "is selected is selected" should be --is selected--.

column 10, line 45, patent reads "possessed" should be --possesses--.

column 12, line 5, patent excludes "ZSM-35" should include --ZSM-35-- after "ZSM-34,".

Signed and Sealed this

Thirteenth Day of October, 1992

Attest:

DOUGLAS B. COMER

*Attesting Officer*   *Acting Commissioner of Patents and Trademarks*